United States Patent [19]

Weddigen

[11] Patent Number: 4,532,195
[45] Date of Patent: Jul. 30, 1985

[54] ELECTROCHEMICAL STORAGE CELL COMPRISING AN ANODE AND A CATHODE MADE OF A SYNTHETIC POLYMER

[75] Inventor: Gert Weddigen, Heidelberg, Fed. Rep. of Germany

[73] Assignee: Brown, Boveri & CIE AG, Mannheim-Kafertal, Fed. Rep. of Germany

[21] Appl. No.: 563,874

[22] Filed: Dec. 21, 1983

[30] Foreign Application Priority Data

Dec. 24, 1982 [DE] Fed. Rep. of Germany ....... 3248076

[51] Int. Cl.³ .......................................... H01M 10/40
[52] U.S. Cl. .................................. 429/213; 429/199; 429/194
[58] Field of Search ............... 429/213, 212, 194, 197, 429/199; 204/291; 252/500, 518

[56] References Cited

U.S. PATENT DOCUMENTS 4,375,427  3/1983  Miller et al. .................. 429/213 X
4,401,545  8/1983  Naarmann et al. ............ 429/213 X
4,442,187  4/1984  MacDiarmid et al. ............ 429/213

FOREIGN PATENT DOCUMENTS 1216549  12/1970  United Kingdom ................ 429/213

OTHER PUBLICATIONS

Developments in Plastic Battery Technology, The Battery Man, Nov. 1981.

Primary Examiner—Anthony Skapars
Attorney, Agent, or Firm—Herbert L. Lerner; Laurence A. Greenberg

[57] ABSTRACT

Rechargeable electrochemical storage cell with an anode and a cathode, both of which are made of synthetic polymer and are surrounded by a liquid electrolyte. The anode as well as the cathode are made of synthetic polymers which has triaromatic methane units as building blocks, and the polymers are electrochemically doped reversably with ionic doping substances.

4 Claims, 1 Drawing Figure

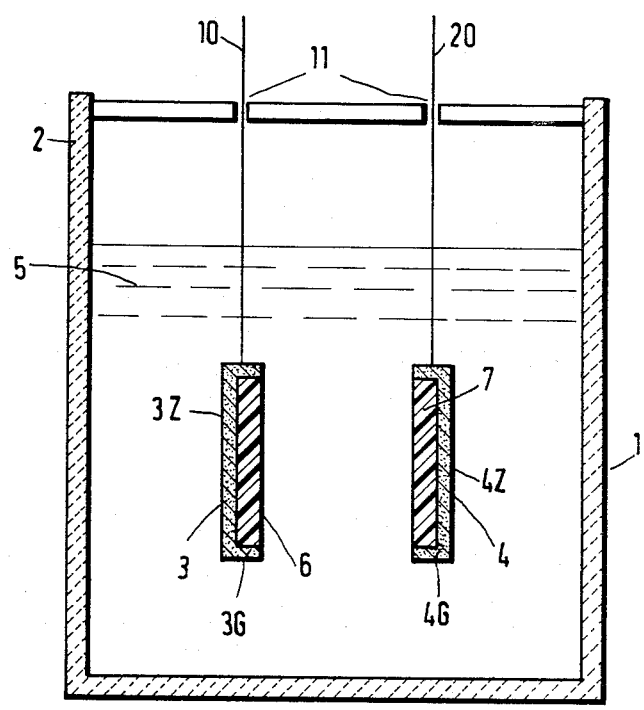

ELECTROCHEMICAL STORAGE CELL COMPRISING AN ANODE AND A CATHODE MADE OF A SYNTHETIC POLYMER

CROSS-REFERENCE TO RELATED APPLICATION

The following application, assigned to Brown, Boveri & Cie AG, the assignee of the present invention is hereby incorporated by reference; Application Ser. No. 563,871 filed on Dec. 21, 1983.

BACKGROUND OF THE INVENTION

1. Field of the Invention

The invention relates to a rechargeable electrochemical storage cell with an anode made of synthetic polymer and a cathode made of a synthetic polymer and with both the anode and the cathode surrounded by a liquid electrolyte.

2. Description of the Prior Art

Such an electrochemical storage cell is suitable for constructing storage batteries with high energy and power density.

European Patent Application No. 00 36 118 discloses a rechargeable electrochemical storage cell which has a solid anode and a solid cathode surrounded by a liquid electrolyte. The anode and the cathode are made of a synthetic polymer. In particular, the polymer forming the cathode is doped with halogenide ions and the polymer forming the anode with metallic ions. A disadvantgage in this battery is that the polyacetylene used does not have a particularly long service life if it is exposed to the action of air. This means that such a storage cell must be encapsulated airtight if it is intended for long-term operation. This maked the manufacturing cost for such a storage cell very high.

SUMMARY OF THE INVENTION

An object of the invention is to provide an electrochemical storage cell of the type mentioned at the outset which is suitable for the constructions of storage batteries with high operating reliability and long life.

With the foregoing and other objects in view, there is provided in accordance with the invention a rechargeable electrochemical storage cell comprising a housing, an anode in the housing made of a synthetic polymer which has triaromatic methane units as building blocks, a cathode spaced from the anode in the housing made of a synthetic polymer which has triaromatic units as building blocks, a liquid electrolyte in the housing which surrounds the anode and surrounds the cathode, and wherein the polymer of the anode and the polymer of the cathode are electrochemically doped reversably with ionic doping substances.

Other features which are considered as characteristic for the invention are set forth in the appended claims.

Although the invention is illustrated and described herein as embodied in an electrochemical storage cell, it is nevertheless not intended to be limited to the details shown, since various modifications may be made therein without departing from the spirit of the invention and within the scope and range of equivalents of the claims.

BRIEF DESCRIPTION OF THE DRAWING

The invention, however, together with additional objects and advantages thereof will be best understood from the following description when read in connection with the accompanying drawing which diagrammatically illustrates an electrochemical storage cell in accordance with the invention having a housing containing a liquid electrolyte in which are immersed an anode constructed of a partially open metal cylinder containing a core of graphite felt saturated with a polymer which has triaromatic methane units as the basic building blocks; and a cathode spaced from the anode, which cathode is similarly constructed and also contains a polymer.

DETAILED DESCRIPTION OF THE INVENTION

The invention relates to a rechargeable electrochemical storage cell with an anode and a cathode which anode and cathode are made of a synthetic polymer which has triaromatic methane units as the basic building blocks. The OH groups of the polymer forming the anode are converted into urethane groups. The polymer forming the cathode is doped with halogens and/or chalcogens. A saturated lithium iodide solution or a saturated sodium iodide solution can be used, for instance, as the liquid electrolyte.

The electrochemical storage cell according to the invention, can be charged and discharged and is highly suitable for the construction of batteries. The storage cell operates at room temperature, in particular, at 20° C., making unnecessary installation of thermal insulation in batteries for maintaining the operating temperature unless the battery is subjected to extreme climatic conditions. The storage cell contains no materials that have harmful side effects. This makes the storage cell very easy to produce. Corrosion phenomena also do not occur with this storage cell since there are no reaction products during charging or discharging which could, for instance, damage the housing of the storage cell through corrosive action and therefore reduce the service life of the storage cell. Sealing problems in the vicinity of the seal of the storage cell also do not occur since the storage cell operates at low temperatures.

According to the invention, the polymer forming the anode is doped with electron donors and the polymer forming the cathode with electron acceptors. The polymer forming the cathode is preferably doped with halogens or chalcogens. Suitable halogens are iodine and bromine, while selenium and sulfur can be considered as chalcogens. Monoisocyanate is added to the polymer which forms the anode thereby converting its OH groups into urethane groups. To improve the operability of the storage cell, the polymer forming the anode can additionally be doped with alkali metals or earth alkali metals. In one embodiment of the invention, the anode as well as the cathode has a core of graphite felt which is impregnated with the polymer which is provided for the construction of the electrodes. For the fabrication of both electrodes, a polymer with triaromatic methane units is used in any case, i.e. this polymer is not a conjugate system as in polyacetylene, since two adjacent single bonds occur periodically in the main chain. Such a polymer can be prepared, for instance, in the polycondensation of bisphenol-A and para-anisaldehyde. The formation of such a polymer can, likewise, be obtained by a catalytic reaction, in which double and/or triple methanes substituted with aromatics are brought to reaction. The same polymer can also be produced by a polycondensation of benzaldehyde and resorcinol, as more fully explained in the Related Application.

A saturated lithium iodine solution is used in the storage cell according to the invention as the liquid electrolyte. This solution is prepared by dissolving lithium iodide in, for instance, tetrahydrofuran.

A saturated sodium iodine solution is likewise suitable as the electrolyte. In this case, sodium iodide is dissolved in diglyme.

The invention will be explained in greater detail in the following, making reference to the drawing.

The major components of the electrochemical storage cell 1 are a housing 2, an anode 3, a cathode 4 and a liquid electrolyte 5. The housing may be made of any suitable material, preferably corrosion-resistant material which is non-conducting and has a long life. The anode 3 and the cathode 4 are arranged within the housing 2 and the liquid electrolyte 5 surrounds the anode and the cathode each on all sides. The anode 3 of the storage cell 1 is bounded on the outside by a metallic cylinder 3Z closed on one side. The height of the cylinder 3Z is only a few millimeters. In the embodiment example shown here, the metallic cylinder 3Z has a height of 2 mm. The inside diameter of the metallic cylinder 3Z chosen here is 3.4 cm. The dimensions of the cylinder can also be made larger depending on the size of the storage cell to be constructed. This does not influence the operation of the storage cell 1. The cylinder 3Z is arranged with its closed surface pointing outward and its longitudinal axis parallel to the upper and lower boundary surface of the housing 2. The lateral outside surface of the cylinder 3Z is connected to an electric conductor 10. The latter is brought to the outside through an opening 11 in the cover surface of the housing and extends beyond the housing 2. The polymer 6 forming the anode is arranged in the interior of the cylinder 3Z. A polymer 6 is used for this purpose which has triaromatic methane units as the basic building blocks. In the embodiment example shown here, the anode 3 has a core of graphite felt 3G which has a porosity of 95%. The graphite felt is completely saturated with the polymer. The use of a graphite felt 3G is not mandatory for the operation of the storage cell. In particular, the polymer can be pressed in the form of pellets which are then placed in the metallic cylinder. Preferably, the size of the pellets is matched to the size of the interior of the cylinder. In the preparation of the polymer forming the anode, a percent by weight of a monoisocyanate are added to the base material of the former sufficient to convert all OH groups of the polymer into urethane groups. This polymer may be doped during its preparation or prior to the impregnation of the graphite felt therewith with an alkali metal or an earth alkali metal. The polymer is soluble in the well known solvents—dimethylformamide, tetrahydrofuran and acetone, so that the graphite felt can be impregnated with this polymer without difficulty. By the above-mentioned addition of monoisocyanate mentioned above and the conversion of the OH groups caused thereby, no hydrogen development occurs at the anode 3.

The cathode 4 and the anode 3 are arranged at a distance from one another and separated by a large quantity of the liquid electrolyte 5. The outer boundary of the cathode 4 is likewise formed by a metallic cylinder 4Z which has the same shape as the cylinder 3Z. Its dimensions are chosen similarly. The closed surface of the cylinder points outward. The lateral outside surface of the cylinder 4Z is connected to an electric conductor 20 which is brought out through an opening 11 in the cover surface of the housing 2 and extends beyond the housing by a few millimeters. The interior of the metallic cylinder 4Z contains the polymer 7 forming the cathode 4. In the embodiment shown here, the cathode 4 has a core consisting of graphite felt 4G. The latter is impregnated with the polymer. Preferably, a polymer is used for this purpose, the basic building blocks of which are formed by triaromatic methane units. The core of graphite felt 3G can also be omitted. In this case, a pellet formed from the polymer is placed in the interior of the cylinder 4Z. The polymer 7 forming the cathode is impregnated with halogens or chalcogens, particularly with iodine or bromine, or selenium or sulfur. The polymer may also be doped with complex anions of the third, fourth, fifth, sixth and/or seventh group of the periodic system of the elements.

In the embodiment example described here, a saturated sodium iodide solution is used as the electrolyte. To form this solution, sodium iodide is preferably dissolved in diglyme.

The operation of the rechargeable electrochemical storage cell 1 according to the invention will be explained in the following.

In charging the storage cell, a d-c voltage source is connected to the electrodes 3 and 4. In particular, the negative pole of the d-c voltage source (not shown here) is connected to the anode 3 and the positive pole to the cathode 4. This causes the sodium ions to migrate toward the anode 3 and the iodine ions toward the cathode 4. The sodium ions are reduced to neutral sodium inside the cathode. Inside the anode, the following chemical reaction proceeds:

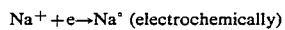
$Na^+ + e \rightarrow Na^\circ$ (electrochemically)

Subsequently, charge transfer complexes are formed from the neutral sodium and the polymer.
In particular, the following reaction occurs inside the anode:

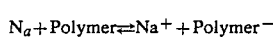
$N_a + Polymer \rightleftharpoons Na^+ + Polymer^-$

At the same time, an electrochemical oxidation of the iodine anions occurs in the vicinity of the cathode.

$I^- - e \rightarrow I^\circ$ (electrochemically)

Subsequently, the iodine atoms form with the polymer charge transfer complexes according to the following equation:

$I^\circ + Polymer \rightleftharpoons I^- + Polymer^+$

The storage cell 1 shown here has an internal resistance of 20 ohms. It is charged with 5 volts for 1.5 hours. Thereby, a rest voltage of about 3 volts is obtained. The rest voltage is calculated according to the following equation:

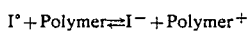
$U_{restv} = \Delta G/(n \times F)$ $\Delta G$ stands here for the free reaction enthalpy, n for the number of electrons per Mol and F for the Faraday constant. From this, the rest voltage value one obtains is $U_{restv} = (287/96.4) \ V \approx 3 V$ During the discharge of the storage cell, a resistor is connected to the electric conductors 10 and 20 of the anode 3 and the cathode 4, respectively. During the discharge, the reverse process proceeds and in particular, the sodium ions migrate from the anode 3 back into the electrolyte. The same applies to the iodine ions.

The foregoing is a description corresponding, in substance, to German application No. P 32 48 076.8, dated Dec. 24, 1982, international priority of which is being claimed for the instant application and which is hereby made part of this application. Any material discrepancies between the foregoing specification and the specification of the aforementioned corresponding German application are to be resolved in favor of the latter.

I claim:

1. Rechargeable electrochemical storage cell comprising a housing, in the interior of which is an anode and a cathode spaced from each other and both provided with a core of graphite felt saturated with a soluble synthetic polymer which has triaromatic units as basic modules and is non-conjugated along a main chain thereof, surrounded by a a liquid electrolyte selected from the group consisting of lithium iodide dissolved in tetrahydrofuran and sodium iodide with diglyme as a solvent, wherein the polymer of the anode has OH-groups and is doped with a member selected from the group consisting of an alkali metal and an earth alkali metal, and monoisocyanate is added to said anode polymer to convert the OH-groups into urethane groups, and wherein the polymer of the cathode is doped with a chalcogen.

2. Rechargeable electrochemical storage cell comprising an anode and a cathode spaced from each other and both provided with a core of graphite felt having a porosity of 95% saturated with a soluble synthetic polymer which has triaromatic units as basic modules and is non-conjugated along a main chain thereof, surrounded by a liquid electrolyte selected from the group consisting of lithium iodide dissolved in tetrahydrofuran and sodium iodide with diglyme as a solvent, wherein the polymer of the anode has OH-groups and is doped with a member selected from the group consisting of an alkali metal and an earth alkali metal, and monoisocyanate is added to said anode polymer to convert the OH-groups into urethane groups, and wherein the polymer of the cathode is doped with a halogen.

3. Rechargeable electrochemical storage cell comprising an anode and a cathode spaced from each other and both provided with a core of graphite felt having a porosity of 95% saturated with a soluble synthetic polymer which has triaromatic units as basic modules and is non-conjugated along a main chain thereof, surrounded by a liquid electrolyte selected from the group consisting of lithium iodide dissolved in tetrahydrofuran and sodium iodide with diglyme as a solvent, wherein the polymer of the anode has OH-groups and is doped with a member selected from the group consisting of an alkali metal and an earth alkali metal, and monoisocyanate is added to said anode polymer to convert the OH-groups into urethane groups, and wherein the polymer of the cathode is doped with a member selected from the group consisting of iodine, bromine, selenium and sulfur.

4. Rechargeable electrochemical storage cell comprising an anode and a cathode spaced from each other and both provided with a core of graphite felt having a porosity of 95% saturated with a soluble synthetic polymer which has triaromatic units as basic modules and is non-conjugated along a main chain thereof, surrounded by a liquid electrolyte selected from the group consisting of lithium iodide dissolved in tetrahydrofuran and sodium iodide with diglyme as a solvent, wherein the polymer of the anode has OH-groups and is doped with a member selected from the group consisting of an alkali metal and an earth alkali metal, and monoisocyanate is added to said anode polymer to convert the OH-groups into urethane groups, and wherein the polymer of the cathode is doped with complex anions selected from the group consisting of the third, fourth, fifth, sixth and seventh group of the periodic system of the elements.

* * * * *